US012782055B2

(12) United States Patent
Strain

(10) Patent No.: US 12,782,055 B2
(45) Date of Patent: Nov. 3, 2026

(54) EMERGENCY COOLING-WATER VACUUM SYSTEM AND METHOD

(71) Applicant: Safe Flow LLC, Burgettstown, PA (US)

(72) Inventor: Robert Strain, Burgettstown, PA (US)

(73) Assignee: SAFE FLOW, LLC, Burgettstown, PA (US)

(*) Notice: Subject to any disclaimer, the term of this patent is extended or adjusted under 35 U.S.C. 154(b) by 384 days.

(21) Appl. No.: 18/391,172

(22) Filed: Dec. 20, 2023

(65) Prior Publication Data

US 2024/0125553 A1 Apr. 18, 2024

Related U.S. Application Data

(63) Continuation of application No. PCT/US2022/035238, filed on Jun. 28, 2022.

(60) Provisional application No. 63/215,589, filed on Jun. 28, 2021.

(51) Int. Cl.

| | |
|---|---|
| ***F27D 21/00*** | (2006.01) |
| ***F27D 9/00*** | (2006.01) |
| *C21B 11/10* | (2006.01) |
| *H05B 7/12* | (2006.01) |

(52) U.S. Cl.

CPC ............... *F27D 21/00* (2013.01); *F27D 9/00* (2013.01); *C21B 11/10* (2013.01); *F27D 2009/0013* (2013.01); *F27D 2021/0071* (2013.01); *H05B 7/12* (2013.01)

(58) Field of Classification Search

CPC .... F27D 21/00; F27D 9/00; F27D 2009/0013; F27D 2021/0071; F27B 3/24

See application file for complete search history.

(56) References Cited

U.S. PATENT DOCUMENTS

| | | | |
|---|---|---|---|
| 4,815,096 A | 3/1989 | Burwell | |
| 6,031,861 A | 2/2000 | Koster | |

FOREIGN PATENT DOCUMENTS

| | | | | |
|---|---|---|---|---|
| CN | 105423758 A * | 3/2016 | ............... F27D 9/00 |
| CN | 113028830 A * | 6/2021 | ............. F27D 21/00 |
| EP | 0123168 A1 * | 10/1984 | ............... F27D 1/12 |
| EP | 3762514 B1 * | 8/2024 | ........... F27D 17/302 |
| GB | 13965 | 9/1907 | |
| JP | S 63303016 | 12/1988 | |
| JP | H03251680 | 11/1991 | |
| WO | 2002048406 | 6/2002 | |
| WO | WO-0248406 A1 * | 6/2002 | ............... F27D 1/12 |

(Continued)

*Primary Examiner* — Gregory A Wilson

(74) *Attorney, Agent, or Firm* — Blynn L. Shideler; Krisanne Shideler; .BLK Law Group

(57) ABSTRACT

An emergency cooling-water vacuum system and associated method for a pressurized water cooled furnace having an emergency shut off preventing pressurized cooling fluid from moving to the cooling components in the furnace, said system including at least one vacuum inducing unit, a diversion inlet line of pressurized cooling fluid to the vacuum inducing unit configured to be open when the emergency shut off is activated to prevent pressurized cooling fluid from moving to the cooling components in the furnace; and a vacuum line extending from the cooling components in the furnace to the at least one vacuum inducing unit, wherein a vacuum is induced in the vacuum line when pressurized cooling fluid is directed through the at least one vacuum inducing unit.

18 Claims, 1 Drawing Sheet

(56) References Cited

FOREIGN PATENT DOCUMENTS

| | | | | | |
|---|---|---|---|---|---|
| WO | WO-2018042296 A1 * | 3/2018 | ............. | F27D 17/10 |
| WO | 2023278390 | 1/2023 | | |

* cited by examiner

FIG. 1
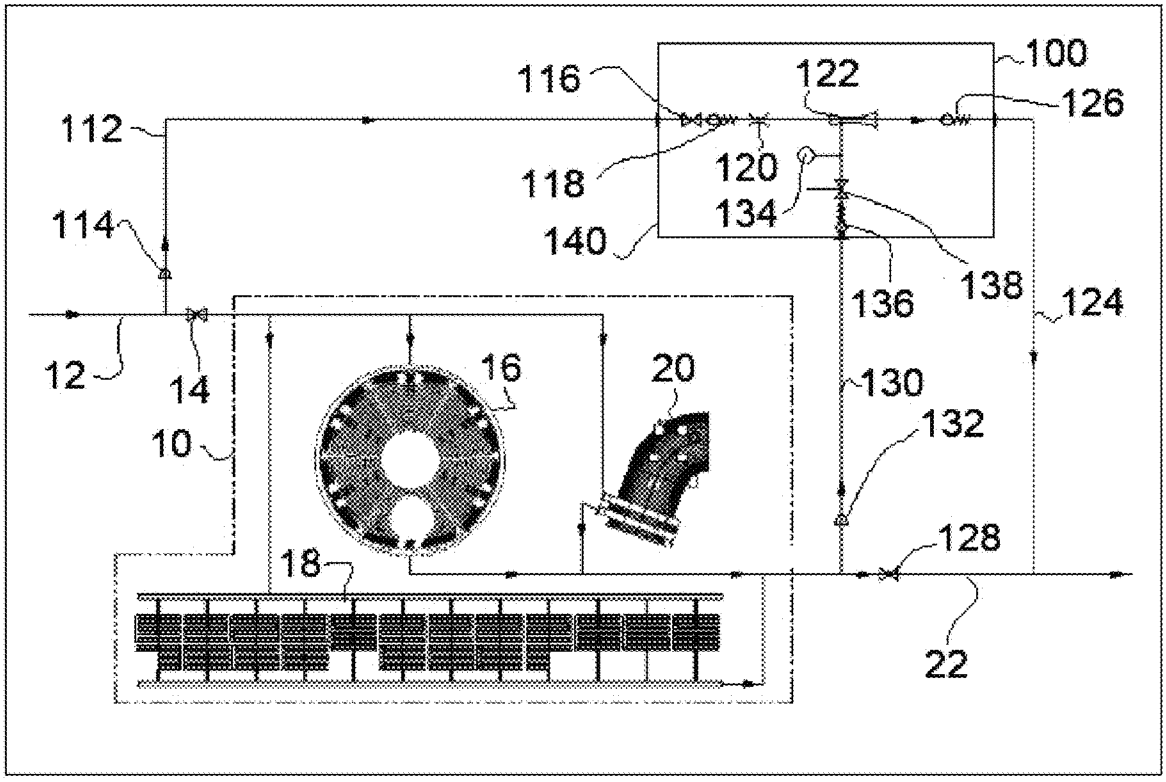
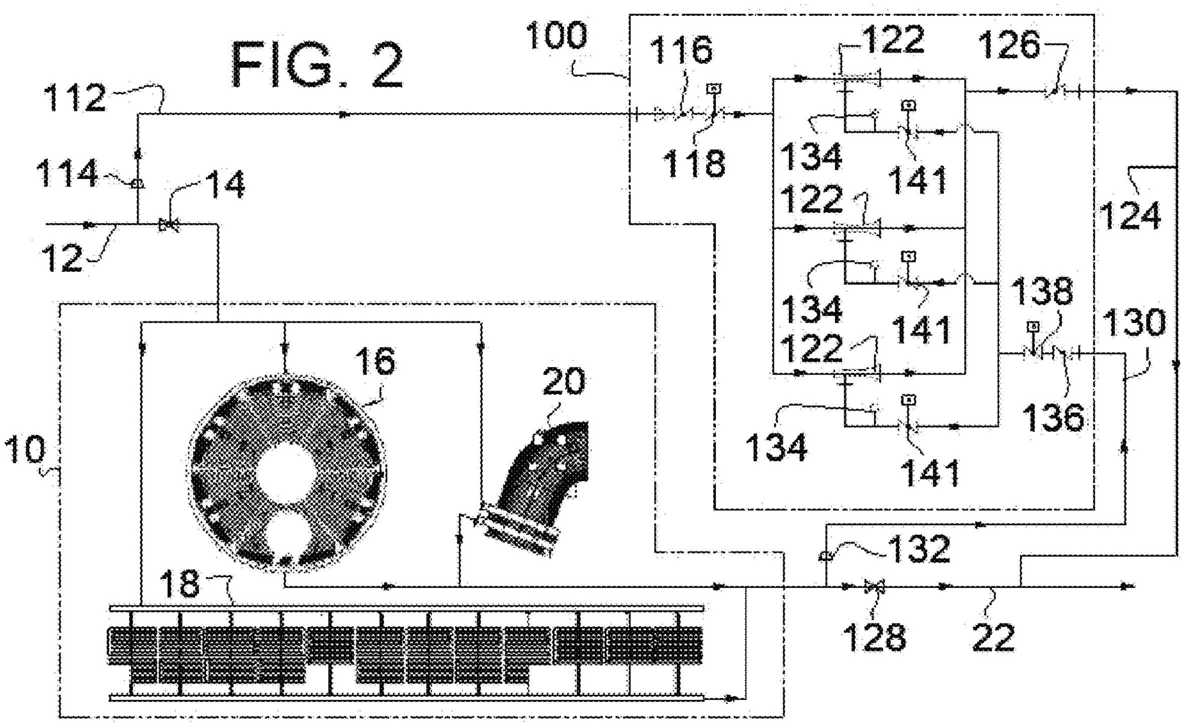
FIG. 2

EMERGENCY COOLING-WATER VACUUM SYSTEM AND METHOD

RELATED APPLICATIONS

This application is a continuation of International Patent Application Serial Number PCT/US22/035238 filed Jun. 28, 2022 and published Jan. 5, 2023 as publication number WO 2023/278390 which application and publication are incorporated herein by reference.

International Patent Application Serial Number PCT/US22/035238 claims the benefit of U.S. Provisional Patent Application Ser. No. 63/215,589 filed Jun. 28, 2021 titled "Emergency Cooling-Water Vacuum System and Method" which application is incorporated herein by reference.

BACKGROUND OF THE INVENTION

1. Field of the Invention

This invention generally relates to furnace cooling water systems and the emergency stopping and repair of the furnaces having the same.

2. Background Information

Electric Arc Furnaces (EAFs)

Over the past 30-40 years, EAFs used in steelmaking and other processes have been running longer, harder and faster as facilities make it a priority to ramp up production. In addition to more demanding operating schedules, many furnaces have been equipped with larger electrodes, oxygen lances or secondary chemical energy sources to generate more power and boost furnace ratings. The fact is, regardless of furnace age, most of today's EAF operations tend to run hotter, have shorter tap to tap times and produce more heats (batches of molten steel) per day than ever before. As EAFs are increasingly pushed and stretched to the limits, the goal of ensuring safe and reliable operation has never been more challenging. During this period of escalating production demands, EAF furnace accidents have unfortunately been widespread and do not seem to be abating.

For example, eight steelworkers were injured after an EAF exploded May 29, 2021 at the Evraz Rocky Mountain Steel Plant in Pueblo, Colorado, about 100 miles north of the New Mexico border. News reporting stated the fire department attributed the likely cause to water being introduced to the furnace at a high temperature causing the explosion. "It sounds like they had a cooling system failure, which is when water was introduced, which is potentially what caused the explosion," Assistant Chief Keith Miller of the Pueblo Fire Department is reported to have stated, adding that the fire crew had to wait for the steel in the furnace to cool in order to go into the plant and fight the fire.

In a U.S. steel mill in 2016, a reaction in a 175-ton EAF triggered an explosion, injuring two steelworkers and cooling system failure has been suggested as a likely culprit.

In Knoxville, Tennessee, May 2014, one steelworker was killed and five others injured by a hydrogen explosion occurring when a leak caused more than 1,000 gallons of water to pour into a 2,900 degree (F.) EAF, tossing out "fragments of molten metal and debris", according to a report by the Tennessee Occupational Safety and Health Administration (TOSHA). Workplace procedures call for employees to shut off the water and evacuate the area when there is a leak.

Also in 2014 one steelworker was killed when a pipe exploded in a BOP furnace.

In 2013 in a Mexican steel mill fourteen steelworkers were killed in an explosion occurring during maintenance of a DRI intake of an EAF. Also in 2013 in a US steel mill three steelworkers were injured in an EAF explosion tied to a water leak. Also in 2013, in a US steel mill a steelworker was killed in an EAF explosion in which a cause was not identified, but again the a likely cause rests in the cooling system.

In Louisville, Kentucky, March 2011 two employees were killed and two others injured by a steam explosion in a chemical plant usage of an EAF. According to the Chemical Safety Board (CSB), "the deaths and injuries likely resulted when water leaked into the electric arc furnace causing an over-pressure event, ejecting furnace contents heated to approximately 3800 degrees F." The CSB reports that the explosion occurred after the company failed to investigate similar but smaller explosive incidents over many years while deferring crucial maintenance of the EAF. In February 2013, as part of its final investigation report on the incident, the CSB cited the need for a standard mechanical integrity program for electric arc furnaces that would include preventive maintenance based on periodic inspections and timely replacement of furnace covers.

In Portage, Indiana, January 2010 one person was killed and four others injured in an explosion at a northwest Indiana steel mill. It was the second at the Portage facility since the previous November, when eight workers were injured. Portage Mayor Olga Velazquez reported that water mixing with molten slag in one of the mill's furnaces caused the explosion. Four workers, who were investigating a water leak in the EAF when the explosion occurred, were taken to nearby hospitals.

While the above reported instances in the last ten years or so used different terminology for the causes (or avoid expressly stating a cause), they were all likely a result of water being introduced into the EAF, generally into the molten steel inside the furnace and causing an explosion. These few examples described above comprise some of the more serious incidents that make news. However, it is believed that these represent just the tip of the iceberg. Smaller explosions or "near misses" sometimes occur in which there may be no injuries yet there will invariably be property damage, sometimes extensive. These lesser incidents are often not reported to the media nor to regulatory agencies, but they may nonetheless be costly and disruptive to facility operations as well as posing a serious threat to safety.

Getting an accurate handle on the frequency of EAF explosions is made more difficult by the diverse applications for these furnaces. Though EAFs are typically associated with steelmaking, EAFs are actually used by a variety of industries; and while the degree of risk varies with the application, there is always the potential for explosions to occur, as seen with the above described fatal Louisville accident which occurred in a furnace used in the production of calcium carbide. EAFs are used in a wide range of other extreme heat load applications in iron and steel foundry works, in addition to steelmaking industries which produce steel from iron and ferrous ores and steel scrap; non-ferrous industries (including aluminum, bronze, brass, copper, zinc titanium, tin and lead); mining/ore smelting; carbide and other specialty chemical manufacturing; and powdered metallurgy. There are estimated to be thousands of EAFs in use on a global basis across these industries, thus the potential for disaster becomes very evident.

A number of U.S. agencies are concerned with the issue of EAF explosions—among them the Occupational Health & Safety Administration (OSHA), the National Fire Protection Association (NFPA), the CSB, and industry groups such as the Association for Iron & Steel Technology (AIST) and the American Foundry Society. In 2013, when the CSB published its final report on the Louisville investigation, they called for development of a standard that "will provide guidance for industry on the safe handling of hazardous processes that may not otherwise be regulated by other safety regulations, such as OSHA's Process Safety Management (PSM) Program". However, at this time nine years later no industry or regulatory group is spearheading a safety program or standard targeted at the specific problem of electric arc furnace explosions.

JPH03251680 discloses a DC electric furnace designed to minimize or eliminate steam explosions "even if molten steel leaks." The design utilizes automatic shut off and a decompression tank maintained below pressure used to suck residual water away from the furnace in the detection of a leak.

WO 2002-48496 discloses a cooling system for a furnace in which the operating pressures of the cooling flow are maintained such that in the event of a leak in a cooling element no fluid is drawn into the melting furnace but rather ambient air or oven gasses are sucked into the internal cooling channel through the leak. This is intended to minimize the chance of a steam explosion.

U.S. Pat. No. 4,815,096 discloses a cooling system and method for molten material handling vessels which is incorporated herein by reference to demonstrate the state of the prior art. U.S. Pat. No. 6,031,861 discloses an electrode and cooling element for a metallurgical vessel which is incorporated herein by reference to demonstrate the state of the prior art.

Mechanics of EAF Steam Explosion

In the fatal accidents described above, and in many others documented as well, there is a common denominator: Water leaks into a hot furnace in large enough quantities to become superheated and trigger a violent steam explosion. In order to fully understand how this occurs, it is first necessary to look at how EAF cooling technology has developed over time.

Older-style EAFs used refractory brick liners to help the furnace withstand the extremely high operating temperatures within. Though the bricks did not melt, they tended to break apart as furnaces began operating at higher capacities with much higher temperatures and pressures, and with the added use of supplemental chemical energy. Although refractory-lined furnace roofs are still used in some applications such as copper smelting, where the arc is submerged beneath the molten level of the metal, they are no longer sustainable for modern iron and steelmaking processes.

The solution was to protect EAF roofs and other components with a system of tubular panels with high-pressure water pumped through them to provide cooling. Most of the tubular systems used to cool EAF upper shells and roofs consist of an external support structure or "spider" that doubles as the cooling water supply and return headers, with an arrangement of multiple tube panels hung on the inside of the spider. Multiple supply and drain lines and flow control valves are required from the headers to the individual tubular panels. The individual panels are typically made from either carbon steel, copper or aluminum bronze material and utilize multiple pieces of heavily welded pipe and welded return elbows.

Pressurized water is an effective coolant, however, it becomes problematic when leaks crop up. Most leaks begin as small cracks caused by thermal fatigue which is inherent to the heavily welded construction required to build these panels. When the furnace is in heating mode, the steel is expanded and compressed enough that the crack doesn't open up, so only a small amount of cooling water can enter the furnace. When the surface cools down and the steel contracts between heats, the crack opens up and the highly pressurized system literally forces cooling water to infiltrate and basically flood the furnace with water. Alternatively, leaks are sometimes caused when an errant arc strike or mechanical puncture during operation creates holes, in which event water at very high pressure and possibly high volumes may enter the furnace even more rapidly. A pressurized tubular cooling system typically operates at 80-100 psi water pressure, which is enough pressure to allow water buildup to occur very quickly. For example, a two-square-inch hole in a tubular panel results in more than 16,000 gallons of water spilled into the furnace in just one hour, an amount equal to the water in a typical backyard swimming pool.

Water pouring into a furnace will not, in itself, generate an explosion if it sits on top of the molten bath of steel and boils off. The problem usually occurs during normal steel-making operation when the furnace tilts or rocks to tap and slag either to pour out steel or impurities. This action can cause the sloshing molten metal to encapsulate the water, immediately converting it into steam. It then expands to over 1700 times its original volume, which happens very rapidly—generating a violent explosion that can blow the roof off a furnace and send steam, molten steel and debris flying hundreds of feet and placing people and equipment at risk.

One approach for avoiding explosions with tubular systems has been to install an electronic monitoring system to measure the water content of the off gas and detect irregularities. Other leak detection methodologies have been proposed and implemented.

When a water leak is detected or suspected, the water to the EAF is immediately shut off, the EAF allowed to cool until the leak can be repaired, typically by welding. Minimizing the chance of explosion as well as downtime during repair remain significant goals in the industry.

There is a need to minimize chance of explosion in water cooled furnaces as well as downtime during repair of the same.

SUMMARY OF THE INVENTION

The various embodiments and examples of the present invention as presented herein are understood to be illustrative of the present invention and not restrictive thereof and are non-limiting with respect to the scope of the invention.

The present invention provides an emergency cooling-water vacuum system for a water cooled furnace that acts to minimize chance of explosion in water cooled furnaces as well as minimize the downtime during repair of the same.

One aspect of the invention may be described as an emergency cooling-water vacuum system for a pressurized water cooled furnace having an emergency shut off preventing pressurized cooling fluid from moving to the cooling components in the furnace, said system including at least one vacuum inducing unit, a diversion inlet line of pressurized cooling fluid to the at least one vacuum inducing unit configured to be open when the emergency shut off is activated to prevent pressurized cooling fluid from moving to the cooling components in the furnace; and a vacuum line extending from the cooling components in the furnace to the at least one vacuum inducing units, wherein a vacuum is induced in the vacuum line when pressurized cooling fluid is directed through the at least one vacuum inducing unit.

One aspect of the present invention provides a method of emergency cooling water shut off in a pressurized water cooled furnace preventing pressurized cooling fluid from moving to the cooling components in the furnace, said method comprising the steps of: Opening a diversion inlet line of pressurized cooling fluid when the emergency shut off is activated to prevent pressurized cooling fluid from moving to the cooling components in the furnace; Directing pressurized cooling fluid from the diversion inlet line through at least one vacuum inducing unit; and Inducing a vacuum in a vacuum line extending from the cooling components in the furnace to the at least one vacuum inducing unit.

The system uses a standard pressurized cooling system and allows the furnace, in shut down operation, to reverse the pressure to negative pressure to stop leakage, regardless of the head pressure in the furnace.

These and other advantages of the present invention are described below in connection with the attached figures in which like reference numerals represent like elements throughout.

BRIEF DESCRIPTION OF THE FIGURES

FIG. 1 is a schematic view of an emergency cooling-water vacuum system according to one embodiment of the present invention.

FIG. 2 is a schematic view of an emergency cooling-water vacuum system according to a second embodiment of the present invention.

BRIEF DESCRIPTION OF THE PREFERRED EMBODIMENTS

The present invention provides an emergency cooling-water vacuum system 100 for a water cooled furnace 10 and associated method that acts to minimize the chance of explosion in water cooled furnaces as well as to minimize downtime during repair of the water cooled furnace 10 with two embodiments of this system 100 shown in schematically in FIGS. 1 and 2.

The system 100 is shown in FIGS. 1 and 2 implemented with an EAF 10, but can be implemented in any water cooled furnace arrangement in which steam explosion minimization and repair facilitation is desired. A full understanding of the existing water cooled system and the emergency stopping of water supply for the EAF 10 will better explain the system 100 of the present invention. The system 100 as shown allows for easy retrofitting of an existing EAF 10 to incorporate the system 100.

An existing water cooled EAF 10 includes a water inlet line 12 from a source of cooling water (not shown) as well as an emergency shut off valve 14 upstream of the EAF 10. When a water leak is detected in the EAF 10 without system 100 installed the shut off valve 14 is turned off and cooling water is prevented from flowing to the EAF 10. The valve 14, and a pump from the source of cooling fluid, will be controlled by control unit accessed in a control room by the operators, although the emergency shut off may also have one, or more, activation buttons outside of the control room that are easily assessable by workers.

The inlet 12 divides into separate EAF 10 cooling components, which are shown as an EAF top cooling structure 16, a sidewall cooling structure 18 and an off gas system cooling structure 20. The structures of the cooling shells or jackets forming the top cooling structure 16, the sidewall cooling structure 18 and the off gas system cooling structure 20 are generally known in the art.

When there is a leak in one of these areas, it is these elements (the EAF top cooling structure 16, the sidewall cooling structure 18 and the off gas system cooling structure 20) that must be repaired before the EAF 10 goes back into operation after a shutdown. Such a repair generally requires welding. Often in this repair, one or more welds must be performed upside down in the area of the leak, and this orientation for the weld can make the process of welding more difficult.

The existing water cooled EAF 10 includes a water outlet line 22 collecting water from each of the EAF top cooling structure 16, the sidewall cooling structure 18 and the off gas system cooling structure 20. The water outlet line 22 extends to, and returns, the water to the source of cooling water (not shown).

The emergency cooling-water vacuum system 100 for a water cooled furnace 10 is easily added onto existing EAFs 10 and will include a system inlet line 112, with a reducer 114, extending from the inlet line 12 before, or upstream of, the emergency shut off valve 14. The system inlet line 112 flows to an inlet on/off valve 116 and one way check valve 118. The valve 116 is closed in normal operation (when the shut off valve 14 is open) and will open simultaneously with the closing of the emergency shut off 14. The one way check valve 118 forces flow in the system inlet line 112 in one direction and prevents back flow.

In one embodiment of the invention shown in FIG. 1, after the inlet on/off valve 116 and one way check valve 118, the system inlet line 112 flows through a flow control valve 120 that variably controls the flow of the high pressure water through the system 100. The flow control valve 120 can be viewed in the embodiment of FIG. 1 as a control over the vacuum created in the system 100. Alternatively, a vacuum line flow control valve 141 may be provided as discussed below. Where a plurality of eductors 122 are used in parallel as shown in FIG. 2, after the inlet on/off valve 116 and one way check valve 118, the system inlet line 112 flows through a header to equally divide the flow into each of the eductors 122.

The key aspect of the system 100 is flow of the high pressure cooling fluid from system inlet line 112, also called a diversion line, through at least one eductor 122, which is a water powered vacuum creating device. A system 100 with one eductor 122 is shown in FIG. 1 and a system 100 with a plurality, namely a bank of three, eductors 122 mounted in parallel is shown in FIG. 2.

Each eductor 122 is a kind of jet-type pump that does not require any moving parts to be able to pump out or suction out standing water in the top cooling structure 16, sidewall cooling structure 18 and off gas system cooling structure 20 of the EAF 10 when in emergency operation. Each eductor 122 make use of its structure to transfer energy from one fluid to another via the Venturi effect.

The Venturi effect is the reduction in fluid pressure that results when a fluid flows through a constricted section (or choke) of a pipe. The Venturi effect is named after its discoverer, the 18th century Italian physicist, Giovanni Battista Venturi. In inviscid fluid dynamics, an incompressible fluid's velocity must increase as it passes through a constriction in accord with the principle of mass continuity, while its static pressure must decrease in accord with the principle of conservation of mechanical energy (Bernoulli's principle). Thus, any gain in kinetic energy a fluid may attain by its increased velocity through a constriction is balanced by a drop in pressure. This pressure drop creates the vacuum in the present system for the vacuum line 130.

Following the eductor 122, or bank of eductors 122 in the embodiment of FIG. 2, a return line 124 extends to the water outlet line 22 downstream of the EAF 10 to return cooling fluid to the source of cooling fluid. A one way check valve 126 in line 124 prevents backflow in line 124.

The system 100 includes a second emergency stop valve 128 added into the water outlet line 22 downstream of the EAF 10, downstream of a vacuum line 130 coupled to the line 22 and upstream of the connection of the line 124 and line 22. The valve 128 operates simultaneously with the valve 14 and is open in normal operation and closed in emergency operation. The second emergency stop valve 128 essentially prevents the vacuum line 130 from pulling fluid from downstream during operation.

The system 100 includes the vacuum line 130 coupled to the line 22 downstream of the EAF 10 and upstream of the second stop valve 128. The vacuum line 130 may include a reducer 132.

The vacuum line 130 flows to a one way check valve 136 and an on/off valve 138. The valve 138 is closed in normal operation (when the shut off valve 14 is open) and will open simultaneously with the closing of the emergency shut off 14. The one way check valve 136 forces flow in system vacuum line 130 in one direction and prevents back flow.

The system 100 in FIG. 1 includes a gauge 134 to measure the strength of the vacuum created in line 130 which can be adjusted via the control of the flow via valve 120. The system 100 in FIG. 2 has the vacuum line 130 truncate into a header to distribute the flow across the bank of eductors 122. The system 100 in FIG. 2 includes a vacuum line flow control valve 141 for each eductor 122 and includes a gauge 134 to measure the strength of the vacuum created in that portion of the line 130 with the associated eductor 122 and which can be adjusted via the control of the flow via valve 141. The separately controllable bank of eductors 122 and separate vacuum flow control 141 yields some redundancy and greater flexibility to the system of FIG. 2. In operation it is possible that only some of the eductors 122 of the bank of eductors 122 will be utilized, and those that are used may be operated at different flows in some applications.

The elements of the system 100 can be housed within a housing 140, other than the lines 112, 124 and 130, reducers 114 and 132 and the shutoff 128. In adding to existing furnace applications, also called retrofitting, essentially the housing 140 is mounted in a suitable location generally near the furnace and the lines 112, 124 and 130, reducers 114 and 132 and the shutoff 128 added to add (or retrofit) the system 100 into the existing EAF 10 (or other water cooled furnace)

Each of the eductors 122 has an injector chamber with a narrow shaped nozzle, or tapered jet, which is located inside the chamber and points axially towards the exhaust chamber to increase the pressure of the motive fluid as it enters the eductor 122. At the bottom of this nozzle is an opening to which line 130 is coupled and is used to suck in standing water from the EAF 10 in the cooling fluid shut-off condition. The suction in line 130 happens due to the Venturi effect that creates a drop in pressure at the tip of the nozzle of eductor 122 due to the fast flowing motive fluid which has gained kinetic energy due to the tapered shape of the nozzle. This difference in pressure causes the desired fluid in line 130 to be sucked into the eductor 122, or bank of eductors 122, and mixed into the flow stream to be guided out of the associated eductor 122 in line 124.

The eductors 122 are well suited to be used in this application and can minimize the chance of explosions, both due to the elimination of standing water and the prevention of the vacuum creation from being exposed to standard electric or internal combustion powered pumps. After the motive fluid from line 112 has been mixed with the substance from line 130, the shape inside the associated eductor 122 get narrow once again just before the exhaust hole. This narrow shape causes the kinetic energy of the fluid to drop while causing a change in the pressure. This causes a continuous motion of suction of the fluid to be extracted into the eductor 122. This is known as the Venturi effect and it is responsible for the operation of this device.

The operation of the system 100 of the present invention will be automatic and generally based upon the emergency shut off operation or detection. Operators in the control room may control the vacuum pressure via the valves 120 or 141 to control the vacuum provided. For example there may be some desire to vary the vacuum created by the system 100 during the repair procedure to assist in welding.

In summary, many hot metal/steelmaking/metal processing furnaces, such as the EAF 10, have pressurized water circuit cooling portions. In the event of a water leak, explosions are possible with existing systems. The system 100 of the present invention can minimize the chance of explosion and facilitate repair of the furnace.

In operation when a leak is detected the valve 14 is closed in a conventional fashion by the controller. With the system 100 in place the valve 128 will also close simultaneously and valves 116 and 138 of the system will open simultaneously, and the system 100 will automatically divert the cooling water from its usual flow pattern into the vacuum inducing device of the eductor 122, or bank of eductors 122, in order to put the entire downstream cooling section of the water system (e.g., the top cooling structure 16, the sidewall cooling structure 18 and the off gas system cooling structure 20 of the EAF 10) into vacuum and prevent additional water from coming in contact with the liquid steel. The vacuum will draw off standing water from the downstream side namely the top cooling structure 16, the sidewall cooling structure 18 and the off gas system cooling structure 20 of the EAF 10. The vacuum is adjustable via valve 120, or via valves 141 where a bank of eductors 122 is implemented. The risk of explosions is minimized both because of the active withdrawal of water from the EAF 10 as well as the system 100 not introducing unnecessary sparks.

Further, the repairs of the EAF 10 are enhanced through the minimization of standing water. The vacuum provided by the system 100 can also greatly assist the welding process in the repair of the relevant components of the EAF 10, essentially the operating system 100 can act to pull the welds into the piping which is particularly helpful if welding upside down. The system 100 improves the repair process of the EAF 10 by reducing the repair time and also improving the quality of the repair.

The system 100 will reduce the damage to the furnace 10 when a water leak is detected and minimize downtime with little added cost or complexity to the overall facility. With the system 100 in shut down mode, existing cooling water is redirected to one or more one-piece pumps to create suction on the static cooling water in the furnace. It is extremely easy to add this system 100 onto an existing furnace 10 by merely connecting via simple piping the emergency stop valves and return lines with the system 100.

The system 100 is described in connection with EAF 10 for steelmaking, but is not intended to be limited thereto. The background of the invention notes that water cooled EAF furnaces are used in other industries, like some chemical production applications. Another water cooled furnace application is addressing water cooled ducts above an oxygen furnace in the steel making field.

For another example consider the titanium industry. The titanium industry dates back to the turn of the century, although commercial production of the metal actually started in about 1950. By the end of the twentieth century, the industry was producing more than 100 million pounds per year. Early on, safety problems arose from a lack of knowledge regarding furnace design and related explosions. There have been at least 50 documented VAR furnace explosions in the US titanium industry, the knowledge at the time was based on steel technology, and the hydrogen explosions were a completely new problem. When molten titanium reacts with water, the titanium metal breaks down the water, absorbing the oxygen and liberating the hydrogen, which results in a major explosion. During the first five years of the industry, furnace explosions killed six employees. The very nature of melting titanium in a water-cooled furnace using copper crucibles establishes a risk. Water leaks can occur, and as in the steel making process when water contacts molten titanium, the water turns to steam. However adding to the mix, Titanium has such an affinity for oxygen that it breaks down the water, absorbs the oxygen, and liberates the hydrogen. Under these circumstances, both steam and hydrogen explosions are possible. The system 100 with eductors 122 (having no moving parts or electric components) of the present invention minimizes the chances of igniting a hydrogen explosion when operating thus making the system 100 particularly well suited for this application.

The above invention may be described as an emergency cooling-water vacuum system 100 for a pressurized water cooled furnace, such as EAF 10, having an emergency shut off 14 preventing pressurized cooling fluid from moving to the cooling components (16, 18 and 20) in the furnace 10, said system 100 comprising: a diversion inlet line 112 of pressurized cooling fluid to at least one vacuum inducing unit 122 configured to be open when the emergency shut 14 off is activated to prevent pressurized cooling fluid from moving to the cooling components (16, 18 and 20) in the furnace 10; and a vacuum line 130 extending from the cooling components (16, 18 and 20) in the furnace 10 to the at least one vacuum inducing unit 122, wherein a vacuum is induced in the vacuum line 130 when pressurized cooling fluid is directed through the at least one vacuum inducing unit 122.

The above description is representative of the present invention but not restrictive thereof. The full scope of the present invention are set forth in the appended claims and equivalents thereto.

What is claimed is:

1. An emergency cooling-water vacuum system for a pressurized water cooled furnace having an emergency shut off preventing pressurized cooling fluid from moving to the cooling components in the furnace, said system comprising:

at least one vacuum inducing unit, wherein the at least one vacuum inducing unit includes an eductor;

a diversion inlet line of pressurized cooling fluid to the at least one vacuum inducing unit configured to be open when the emergency shut off is activated to prevent pressurized cooling fluid from moving to the cooling components in the furnace; and a vacuum line extending from the cooling components in the furnace to the at least one vacuum inducing unit, wherein a vacuum is induced in the vacuum line when pressurized cooling fluid is directed through the at least one vacuum inducing unit.

2. The emergency cooling-water vacuum system for a pressurized water cooled furnace according to claim 1 wherein the system further includes a return line following the at least one vacuum inducing unit and extending to a water outlet line downstream of the furnace to return cooling fluid to a source of cooling fluid.

3. The emergency cooling-water vacuum system for a pressurized water cooled furnace according to claim 2 wherein the system further includes a second emergency stop valve in the water outlet line downstream of the furnace and the vacuum line and upstream of return line.

4. The emergency cooling-water vacuum system for a pressurized water cooled furnace according to claim 3 further including at least one flow valve configured to adjust the vacuum in the vacuum line.

5. The emergency cooling-water vacuum system for a pressurized water cooled furnace according to claim 4 wherein Each eductor has an injector chamber with a narrow shaped nozzle located inside the chamber and which points axially towards an exhaust chamber to increase the pressure of the motive fluid as it enters the eductor.

6. The emergency cooling-water vacuum system for a pressurized water cooled furnace according to claim 5 wherein at a bottom of the nozzle of each eductor is an opening to which the vacuum line is coupled and is used to suck in standing water from the furnace in a cooling fluid shut-off condition.

7. An emergency cooling-water vacuum system for a pressurized water cooled furnace having an emergency shut off preventing pressurized cooling fluid from moving to the cooling components in the furnace, said system comprising:

a plurality of vacuum inducing units;

a diversion inlet line of pressurized cooling fluid to the plurality of vacuum inducing units configured to be open when the emergency shut off is activated to prevent pressurized cooling fluid from moving to the cooling components in the furnace; and a vacuum line extending from the cooling components in the furnace to the plurality of vacuum inducing units, wherein a vacuum is induced in the vacuum line when pressurized cooling fluid is directed through the plurality of vacuum inducing units.

8. The emergency cooling-water vacuum system for a pressurized water cooled furnace according to claim 7 wherein the plurality of vacuum inducing units are mounted in parallel.

9. The emergency cooling-water vacuum system for a pressurized water cooled furnace according to claim 8 wherein each vacuum inducing unit is an eductor.

10. A method of emergency cooling water shut off in a pressurized water cooled furnace preventing pressurized cooling fluid from moving to the cooling components in the furnace, said method comprising the steps of:

opening a diversion inlet line of pressurized cooling fluid when the emergency shut off is activated to prevent pressurized cooling fluid from moving to the cooling components in the furnace;

directing pressurized cooling fluid from the diversion inlet line through at least one vacuum inducing unit, wherein the at least one vacuum inducing unit includes an eductor; and inducing a vacuum in a vacuum line extending from the cooling components in the furnace to the at least one vacuum inducing unit.

11. The method of emergency cooling water shut off according to claim 10 wherein the step of directing pressurized cooling fluid from the diversion inlet line through at least one vacuum inducing unit includes directing pressurized cooling fluid from the diversion inlet line through a plurality of vacuum inducing units.

12. The method of emergency cooling water shut off according to claim 11 wherein the plurality of vacuum inducing units are mounted in parallel.

13. The method of emergency cooling water shut off according to claim 12 wherein each vacuum inducing unit is an eductor.

14. The method of emergency cooling water shut off according to claim 10 further including the step of returning the cooling fluid to a source of cooling fluid after passing through the eductor.

15. The method of emergency cooling water shut off according to claim 14 further including the step of closing a second emergency stop valve in a water outlet line downstream of the furnace and a vacuum line and upstream of a return line.

16. The method of emergency cooling water shut off according to claim 15 further including adjusting the vacuum in the vacuum line.

17. The method of emergency cooling water shut off according to claim 16 wherein each eductor has an injector chamber with a narrow shaped nozzle located inside the chamber and which points axially towards an exhaust chamber to increase the pressure of the motive fluid as it enters the eductor.

18. The method of emergency cooling water shut off according to claim 17 wherein at a bottom of the nozzle of each eductor is an opening to which the vacuum line is coupled and is used to suck in standing water from the furnace in a cooling fluid shut-off condition.

* * * * *